(12) United States Patent
Taira

(10) Patent No.: US 11,526,715 B2
(45) Date of Patent: Dec. 13, 2022

(54) CODE GENERATION METHOD

(71) Applicant: TOSHIBA TEC KABUSHIKI KAISHA, Tokyo (JP)

(72) Inventor: Kazuki Taira, Ota Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/537,548

(22) Filed: Nov. 30, 2021

(65) Prior Publication Data

US 2022/0261605 A1    Aug. 18, 2022

(30) Foreign Application Priority Data

Feb. 12, 2021   (JP) .............................. JP2021-021174

(51) Int. Cl.
*G06K 19/06* (2006.01)
*G06K 7/10* (2006.01)

(52) U.S. Cl.
CPC ... *G06K 19/06037* (2013.01); *G06K 7/10386* (2013.01)

(58) Field of Classification Search
CPC ...................... G06K 19/06037; G06K 7/10386
USPC ....................................................... 235/494
See application file for complete search history.

(56) References Cited

U.S. PATENT DOCUMENTS

| 8,179,340 | B2 | 5/2012 | Noguchi et al. |
| 10,255,471 | B2 | 4/2019 | Taira et al. |
| 10,664,675 | B2 | 5/2020 | Taira et al. |
| 10,817,693 | B1* | 10/2020 | Bassani ................ G06K 7/1093 |
| 2004/0206821 | A1* | 10/2004 | Longacre, Jr. ... G06K 19/06037 |
| | | | 235/462.07 |
| 2006/0163357 | A1* | 7/2006 | Kim ..................... G06K 7/0163 |
| | | | 235/494 |
| 2017/0344776 | A1* | 11/2017 | Sharma ............ G06K 19/06112 |

FOREIGN PATENT DOCUMENTS

| JP | 2007-288940 | 11/2007 |
| JP | 2008-77476 | 4/2008 |
| JP | 2010-028309 | 2/2010 |
| JP | 2018-45347 | 3/2018 |
| JP | 2019-61564 | 4/2019 |

* cited by examiner

*Primary Examiner* — Jamara A Franklin
(74) *Attorney, Agent, or Firm* — Amin, Turocy & Watson, LLP

(57) ABSTRACT

According to one embodiment, there is provided a code generation method including acquiring, and generating a code. In the acquiring, class information correlated with each of code rankings based on a plurality of different cell configurations is acquired. In the generating, a plurality of codes including the acquired class information are generated based on the cell configurations according to the code rankings. Each of the plurality of codes includes information indicating the presence or absence of a code of a next related ranking.

20 Claims, 13 Drawing Sheets

FIG. 4
| | | FIRST CODE | SECOND CODE | THIRD CODE |
|---|---|---|---|---|
| HEADER | CODE RANKING (N) | 1 | 2 | 3 |
| | CLASS (CLASS) | WARNING (WA) | LANDMARK (LM) | HISTORY (HIS) |
| | PRESENCE OR ABSENCE OF NEXT CODE (NC_EXIST) | ON | ON | OFF |
| | CLASS OF NEXT CODE (NCLASS) | LM | HIS | NULL |
| BODY | MAIN INFORMATION (BODY) | NULL | NULL | STONE MONUMENT A WAS BUILT IN 1876. |
| CODE | |  |  |  |

CODE GENERATION METHOD

CROSS-REFERENCE TO RELATED APPLICATION

This application is based upon and claims the benefit of priority from Japanese Patent Application No. 2021-021174, filed on Feb. 12, 2021, the entire contents of which are incorporated herein by reference.

FIELD

Embodiments described herein relate generally to a code generation method.

BACKGROUND

A two-dimensional code such as a QR code (Registered Trademark) that encodes specific information is widespread. Generally, simple information with a small recorded information amount is recorded in a two-dimensional code with a lower density, and specific information with a large recorded information amount is recorded in a two-dimensional code with a higher density. The information recorded in the two-dimensional code is read by capturing the two-dimensional code with a camera or the like and decoding the two-dimensional code. In order to correctly read the two-dimensional code with a higher density, the image capturing condition is limited to a narrow area.

For example, if a two-dimensional code with a higher density at a location remote from the user is captured with a camera, if an image is desired to be captured by widening an angel of view to be captured, the two-dimensional code cannot be correctly recognized. Therefore, in order to read the two-dimensional code with the higher density, it is necessary to approach the two-dimensional code to a certain degree to capture an image.

DESCRIPTION OF THE DRAWINGS

FIG. 4 is a diagram illustrating a configuration example of the two-dimensional code generated by the device;

DETAILED DESCRIPTION

However, since the user cannot recognize information of a two-dimensional code until the two-dimensional code is actually read, even if an image is captured by approaching the two-dimensional code with the higher density that is at the location remote from the user, the read information may not be desired information, and thus it is not convenient.

Embodiments provide a technique capable of generating a highly convenient code.

In general, according to one embodiment, there is provided a code generation method including acquiring, and generating a code. In the acquiring, class information correlated with each of code rankings based on a plurality of different cell configurations is acquired. In the generating, a plurality of codes including the acquired class information are generated based on the cell configurations according to the code rankings. Each of the plurality of codes includes information indicating the presence or absence of a code of a next related ranking. According to another embodiment, there is provided a code generation device comprising a processor configured to acquire class information correlated with each of a plurality of code rankings based on a plurality of different cell configurations; and generate a plurality of codes including the acquired class information based on the cell configurations according to the code rankings, wherein each of the plurality of codes includes information indicating a presence or an absence of a code of a next related ranking.

First Embodiment

Hereinafter, a first embodiment is described with reference to the drawings.

For example, the first embodiment relates to the generation of a code such as a two-dimensional code.

Figure 1:
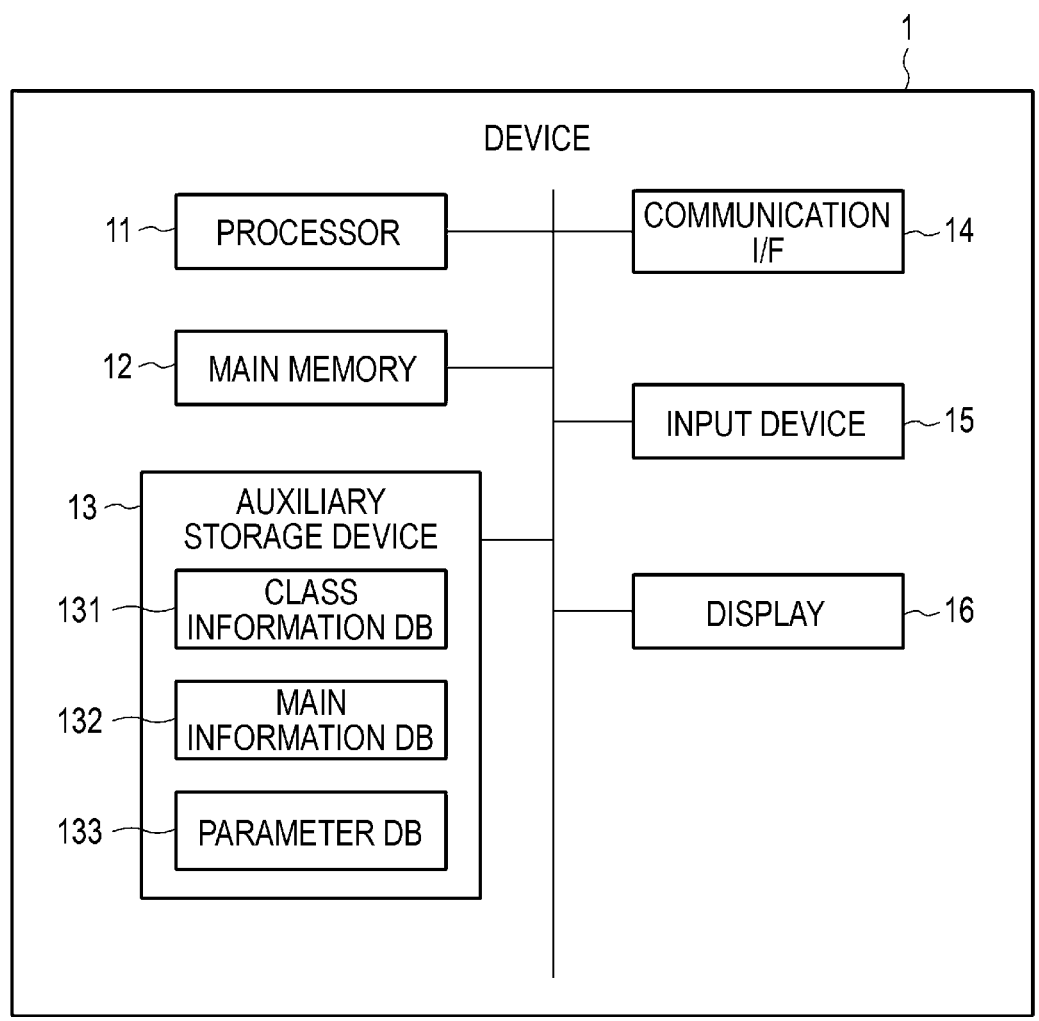
FIG. 1 is a block diagram illustrating a device according to a first embodiment.

FIG. 1 is a block diagram illustrating a device 1 according to the first embodiment.

The device 1 is an electronic device having an information processing function. For example, the device 1 is, for example, a Personal Computer (PC) but may be a smart phone, a tablet terminal, or the like. The device 1 is an example of an information processing device.

The device 1 is a computer including a processor 11, a main memory 12, an auxiliary storage device 13, a communication interface 14, an input device 15, and a display 16. Each unit that configures the device 1 is connected to be capable of inputting and outputting a signal to and from each other. In FIG. 1, the interface is referred to as "I/F".

The processor 11 corresponds to a central portion of the device 1. For example, the processor 11 is a Central Processing Unit (CPU), but is not limited thereto. The processor 11 may be configured with various circuits. The processor 11 loads a program stored in advance in the main memory 12 or the auxiliary storage device 13 onto the main memory 12. The program is a program that causes the processor 11 of the device 1 to realize each unit described below. The processor 11 performs various operations by executing the program loaded onto the main memory 12.

The main memory 12 corresponds to the main memory portion of the device 1. The main memory 12 includes a non-volatile memory area and a volatile memory area. The main memory 12 stores an operating system or a program in the non-volatile memory area. The main memory 12 uses the volatile memory area as a work area in which data is appropriately rewritten by the processor 11. For example, the main memory 12 includes a Read Only Memory (ROM) as the non-volatile memory area. For example, the main memory 12 includes a Random Access Memory (RAM) as the volatile memory area.

The auxiliary storage device 13 corresponds to an auxiliary storage portion of the device 1. For example, the auxiliary storage device 13 is an Electric Erasable Programmable Read-Only Memory (EEPROM) (Registered Trademark), a Hard Disc Drive (HDD), or a Solid State Drive (SSD). The auxiliary storage device 13 stores the program, data used for performing various processes by the processor 11, and data generated by a process in the processor 11.

The auxiliary storage device 13 stores a class information database (DB) 131, a main information DB 132, and a parameter DB 133.

The class information DB 131 stores class information. The class information is information indicating a class of the information stored in the code. The code is, for example, a two-dimensional code. The class information is included in header information of the code. The class of the information is, for example, "warning", "landmark", "history", "traffic", and "signal". The "warning" is information indicating that there is another code in which related information is stored. The "landmark" is information indicating, for example, the name of the landmark. The "history" is information indicating history relating to the correlating landmark. The "landmark" and the "history" are information that correlates to each other. The "traffic" is information indicating, for example, a traffic sign. The "signal" is information relating to the intersection where a traffic light is installed. The "traffic" and the "signal" are information correlating to each other. The class information may be an English abbreviation indicating the class of the information. The English abbreviation is, for example, "WA" indicating "Warning", "LM" indicating "Landmark", "HIS" indicating "History", "TR" indicating "Traffic", and "SIG" indicating "Signal". The class may be referred to as "Class".

The class information is input to the device 1 via the input device 15, for example, by an operation by the user. The operation by the user is text input via the input device 15, selection instruction input from a plurality of class candidates, and the like. The class information DB 131 is updated whenever the class information is input by the user.

The main information DB 132 stores main information. The main information is main information recorded in the code. The main information corresponds to the body information of the code. The main information is text data such as "This stone monument was built in 1876", and "This signal is in front of X station at a pedestrian-vehicle separated intersection of 4 lanes on each side." The main information is not limited to the text data and may be data such as voice data, moving image data, Uniform Resource Locator (URL). The main information is input to the device 1 via the input device 15, for example, by the operation by the user. The operation by the user is text input via the input device 15, selection instruction input from a plurality of main information candidates, or the like. The main information DB 132 is updated whenever the main information is input by the user.

The parameter DB 133 stores the parameter relating to the code generation. The parameter includes, for example, additional information such as a cell size, an error correction level, background, color, and an image format. The parameter is setting information that is designated in case of the code generation. With respect to each parameter, different parameters can be set based on code rankings. The code rankings are rankings of codes based on a plurality of different cell configurations. The cell configuration is the number of cells included in each code. The cell configuration is indicated by, for example, 25×25, 49×49, and 73×73. With respect to the cell configuration, a case where the number of cells is small is said that the density of the cell configuration is low, or the cell configuration is small, and a case where the number of cells is large is said that the density of the cell configuration is high, or the cell configuration is large. In the above example, a code with the number of cells of "25×25" can be expressed as a "small" or "low" cell configuration, a code with the number of cells of "49×49" can be expressed as a "medium" cell configuration, and a code with the number of cells of "73×73" can be expressed as a "large" or "high" cell configuration. A code with a large cell configuration corresponds to a code with a higher density, and a code with a small cell configuration corresponds to a code with a lower density. The cell configuration may also be referred to as a version. The parameter DB 133 stores each parameter and a code ranking in a correlating manner.

The code ranking corresponds to an ascending order of the size of the cell configuration. The code ranking is determined according to the ascending order from a low density of the cell configuration to a high density. For example, a code with a code ranking of "1" is a code with a minimum cell configuration. A code with a code ranking of "2" is a code with the second smallest cell configuration. The cell configuration of the code with the code ranking of "2" is larger than the cell configuration of the code with the code ranking of "1" and is smaller than the cell configuration of a code with a code ranking of "3". The code with the code ranking of "3" is a code with the third smallest cell configuration. The cell configuration of the code with the code ranking of "3" is larger than the cell configuration of the code with the code ranking of "2". If the code ranking is from 1 to 3, the code with code ranking of "3" is the code with the maximum cell configuration.

In the description below, a code set of codes with code rankings of "1", "2", and "3" is described. The code set is a combination of a plurality of correlated codes. The code rankings of the plurality of codes included in each code set are not limited to "1" to "3", and the number of the code rankings may be two or more, for example, "1" to "2", or "1" to "4". The code with the code ranking of "1" may also be referred to as a first code. The code with the code ranking of "2" is also referred to as a second code. The code of the code ranking of "2" is a code with a ranking subsequent to the first code. The code with a subsequent ranking is also referred to as a next code. The code with the code ranking of "3" is also referred to as a third code. The code with the code ranking of "3" is also referred to as a next code of the second code. In this example, the code with the code ranking of "1" and the code with the code ranking of "2" are also referred to as codes with low rankings. In this case, the code with the code ranking of "3" is also referred to as a code with a high ranking. In case of describing a set of the code with the code ranking of "2" and the code with the code ranking of "3", the code with the code ranking of "2" is also referred to as the first code, and the code with the code ranking of "3" is also referred to as the second code.

A parameter is input to the device 1 via the input device 15, for example, by the operation by the user. The operation by the user is text input via the input device 15, selection instruction input from a plurality of parameter candidates, or the like. The parameter DB 133 is updated whenever a parameter is input by the user.

The communication interface 14 includes various interfaces that communicably connect the device 1 to other devices via a network according to a predetermined communication protocol.

The input device 15 is a device that can input data or instructions to the device 1 by a touch operation. For example, the input device 15 is a keyboard, a touch panel, or the like.

The display 16 is a device that can display various screens by the control of the device 1. For example, the display 16 is a liquid crystal display or an Electroluminescence (EL) display.

The hardware configuration of the device 1 is not limited to the above configuration. The above components can be omitted or changed from the device 1, and new components can be added to the device 1.

The procedure of the two-dimensional code generation processes by the device 1 is described.

In the above description, a case where the first code, the second code, and the third code are generated as illustrated in FIG. 4 is assumed. The first code, the second code, and the third code are codes correlating to each other. The first code, the second code, and the third code are a code set of codes that record information relating to a stone monument A. The first code is the code with the code ranking of "1", and is the code with the minimum cell configuration. The second code is the code with the code ranking of "2" and the code with the second smallest cell configuration. The third code is the code with the code ranking of "3" and the code with the maximum cell configuration. The third code corresponds to the last code.

Figure 2:
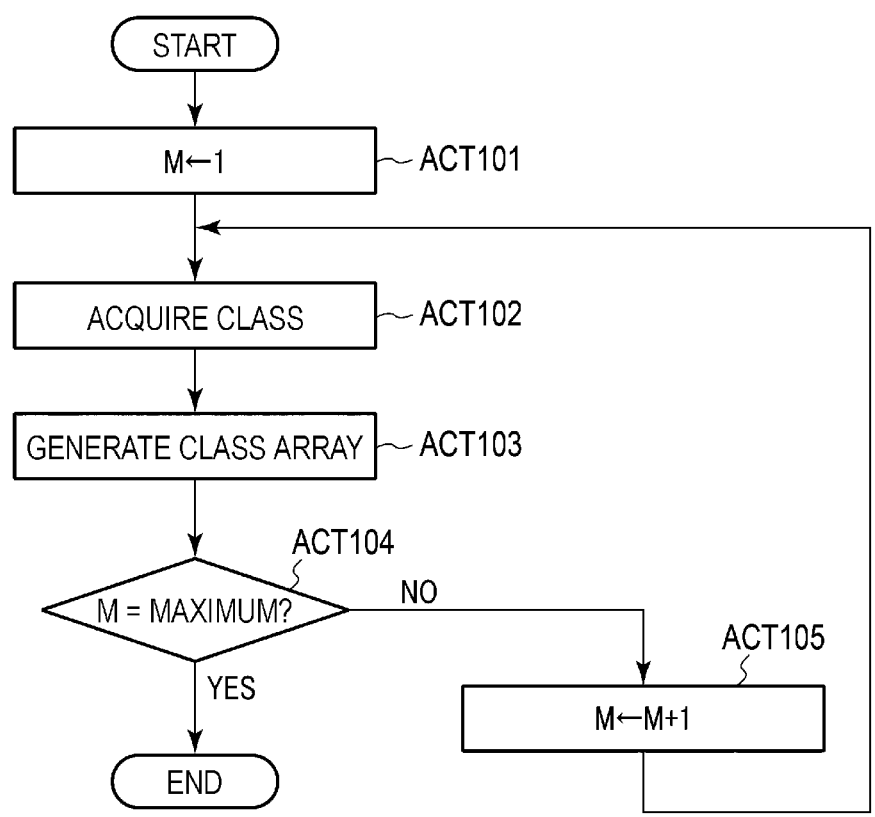
FIG. 2 is a flowchart illustrating a procedure of class information generation processes of a two-dimensional code by the device.

FIG. 2 is a flowchart illustrating the procedure of the class information generation processes of the two-dimensional code by the device 1 according to the first embodiment.

Hereinafter, according to the flowchart illustrated in FIG. 2, the procedure of the class information generation processes of the two-dimensional code by the device 1 will be described with reference to FIG. 4.

The processing procedure described below is merely an example, and each process may be changed, if possible. In the processing procedure described below, steps can be appropriately omitted, replaced, and added in response to the embodiments.

First, the user of the device 1 sets the maximum value of the code ranking with respect to the device 1. The maximum value of the code ranking can be set to any value. In this example, the user sets the maximum value of the code ranking to "3". Next, the user sets the class information of each code with respect to the device 1. The class information set by the user is stored in the class information DB 131. In this example, the user sets a class of the first code as "warning", a class of the second code as "landmark", and a class of the third code as "history". Subsequently, the user sets the main information recorded in each code with respect to the device 1. The main information set by the user is stored in the main information DB 132. In this example, the user sets the main information only in the third code.

The processor 11 sets 1 as the value of a variable M (ACT 101). The variable M indicates a code ranking.

The processor 11 acquires the class information correlating to the variable M from the class information DB 131 (ACT 102). In ACT 102, for example, the processor 11 acquires the class information from the class information DB 131 according to the input class.

The processor 11 generates class arrays indicating the class information with respect to respective code rankings based on the acquired class information (ACT 103). The class arrays indicating the class information generated by the processor 11 correspond to the information set to the "class" items of FIG. 4. The processor 11 stores the class array in the auxiliary storage device 13 whenever the class arrays are generated. The generation includes updating.

The processor 11 determines whether the value of the variable M is the maximum value (ACT 104). The maximum value is the maximum value of the code ranking set by the user. If the processor 11 determines that the value of the variable M is the maximum value (ACT 104: YES), the process ends. If the processor 11 determines that the value of the variable M is not the maximum value by the processor 11 (ACT 104: NO), the process transitions from ACT 104 to ACT 105.

The processor 11 increases the value of the variable M by 1 (ACT 105). After the process of ACT 105, the processor 11 returns to ACT 102.

With the above process, the class information of each code is determined. As illustrated in FIG. 4, with respect to the first code of the code ranking of "1", the "warning (WA)" is set for the "class" item. With respect to the second code of the code ranking of "2", the "landmark (LM)" is set for the "class" item. With respect to the third code of the code ranking of "3", the "history (HIS)" is set for the "class" item.

The class information may be associated with the code ranking in advance. For example, with respect to the plurality of code sets such as the code set relating to the landmark and the code set relating to the signal, the class information and the code ranking may be associated with each other, in advance. With respect to the code set relating to the landmark, the code rankings of "1" to "3" are associated with identification information "warning", "landmark", and "history", respectively. With respect to the code set relating to the signal, the code rankings of "1" to "3" are associated with identification information "warning", "traffic", and "signal", respectively. In this case, the user sets the code set identification information for identifying the code set.

Figure 3:
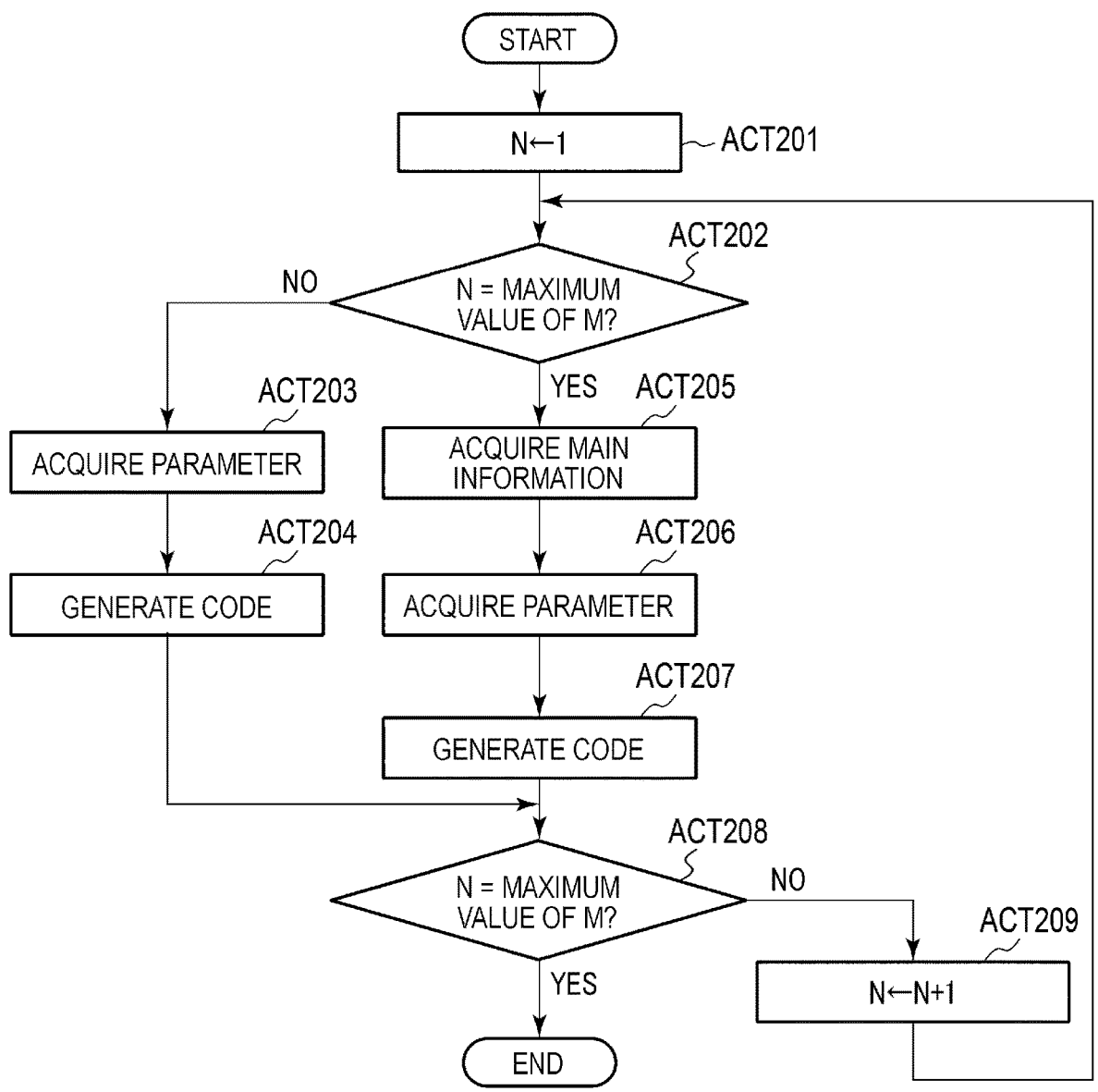
FIG. 3 is a flowchart illustrating a procedure of two-dimensional code generation processes by the device.

FIG. 3 is a flowchart illustrating a procedure of the two-dimensional code generation processes by the device 1 according to the first embodiment.

Hereinafter, according to the flowchart illustrated in FIG. 3, the procedure of the two-dimensional code generation processes by the device 1 is described with reference to FIG. 4.

The processing procedure described below is merely an example, and each process may be changed, if possible. In the processing procedure described below, steps can be appropriately omitted, replaced, and added in response to the embodiments.

The processor 11 sets 1 as the value of a variable N (ACT 201). The variable N indicates the code ranking.

The processor 11 determines whether the value of the variable N is the maximum value of the variable M (ACT 202). If the processor 11 determines that the value of the variable N is the maximum value of the variable M (ACT 202: YES), the process transitions from ACT 202 to ACT 205. If the processor 11 determines that the value of the variable N is not the maximum value of the variable M (ACT 202: NO), the process transitions from ACT 202 to ACT 203.

The processor 11 acquires the parameter correlating to the variable N from the parameter DB 133 (ACT 203).

The processor 11 generates the code with respect to the variable N (ACT 204). In ACT 204, for example, the processor 11 acquires the class array from the auxiliary storage device 13. The processor 11 acquires the class information correlating to the variable N from the class array and class information correlating to a variable N+1. The processor 11 generates a code including the acquired class information based on the cell configuration in response to the variable N with respect to the variable N. The processor 11 generates the code including "N=N, CLASS=CLASS (N), NC_EXIST=ON, and NCLASS=CLASS (N+1)" as the header information of the code. Here, "N" indicates the variable N. "N" corresponds to the "code ranking" item illustrated in FIG. 4. The "CLASS" indicates the class. The "CLASS" corresponds to the "class" item illustrated in FIG. 4. The "class" is the class information correlating to the variable N. The "CLASS (N)" indicates the class correlating to the variable N. "NC_EXIST" indicates the presence or absence of the correlated next code. "NC_EXIST" corresponds to a "presence or absence of next code" item illustrated in FIG. 4. The "presence or absence of next code" is information indicating the presence or absence of the next code. "NC_EXIST=ON" indicates the presence of the next code. "NCLASS" indicates the class of the next code. "NCLASS" corresponds to a "next code class" item illustrated in FIG. 4. The "next code class" is class information correlating to the next code. The "CLASS (N+1)" indicates the class correlating to the variable N+1. The variable N+1 corresponds to the code ranking of the next code. The "presence or absence of next code" and the "next code class" are also referred to as next code information. The next code information is information for identifying the information recorded in the next code.

The processor 11 generates the code indicating "BODY=NULL" as the body information of the code. Here, the "BODY" indicates the main information. The "BODY" corresponds to the "main information" illustrated in FIG. 4. "BODY=NULL" indicates the absence of the main information. In this example, the main information is recorded only in the third code with the code ranking of "3". Therefore, if the variable N is not the maximum value, the processor 11 sets "BODY=NULL" to the main information. The code of which the variable N is not the maximum value does not include the main information. In this example, the code of which the variable N is the maximum value corresponds to the third code. The code of which the variable N is the maximum value is also referred to as the last code. The codes other than the last code correspond to the first code and the second code. The codes other than the last code are also referred to as the codes with the low rankings. In addition, if the main information is recorded in the first code and the second code, a process of ACT 205 described below is added before the process of ACT 203 or the process of ACT 204.

The processor 11 generates the code with respect to the variable N based on the parameter acquired in ACT 203.

The processor 11 acquires the main information correlating to the variable N from the main information DB 132 (ACT 205).

The processor 11 acquires the parameter correlating to the variable N from the parameter DB 133 (ACT 206).

The processor 11 generates the code with respect to the variable N (ACT 207). In ACT 207, for example, the processor 11 acquires the class array from the auxiliary storage device 13. The processor 11 acquires the class information correlating to the variable N from the class array. In this example, the processor 11 acquires the class information correlating to the maximum value of the variable M from the class array. The processor 11 generates the code including the acquired class information based on the cell configuration in response to the variable N with respect to the variable N. The processor 11 generates the code indicating "N=N, CLASS=CLASS (N), NC_EXIST=OFF, NCLASS=NULL" as the header information of the code. Here, "NC_EXIST=OFF" indicates the absence of the next code, and "NCLASS=NULL" indicates the absence of the class of the next code. The code of which the variable M is the maximum value corresponds to the last code. In this example, the last code is the third code.

The processor 11 generates the code indicating "BODY="main information"" as the body information of the code with respect to the variable N. In this example, a code including body information "BODY="stone monument A was built in 1876 . . . "" is generated as the third code. The main information is not limited to the text data, and may be data such as voice data, moving image data, and URL.

The processor 11 generates the code with respect to the variable N based on the parameter acquired in ACT 206.

The processor 11 determines whether the value of the variable N is the maximum value of the variable M (ACT 208). If the processor 11 determines that the value of the variable N is the maximum value of the variable M (ACT 208: YES), the process ends. If the processor 11 determines that the value of the variable N is not the maximum value of the variable M (ACT 208: NO), the process transitions from ACT 208 to ACT 209.

The processor 11 increases the value of the variable N by 1 (ACT 209). The processor 11 returns to ACT 202 after the process of ACT 209.

As shown in ACTS 204 and 207, the processor 11 can acquire the class information correlating to the code rankings based on the plurality of different cell configurations, respectively. The processor 11 can generate the plurality of codes including the acquired class information based on the cell configuration in response to the code ranking. The plurality of codes may include information indicating the presence or absence of correlated codes with the next rankings, respectively. The processor 11 can set the information indicating the presence of the next code such as "NC_EXIST=ON" to the codes other than the last code among the plurality of codes. The codes other than the last code among the plurality of codes may include information indicating the presence of the next code. Meanwhile, the processor 11 can set the information indicating the absence of the next code such as "NC_EXIST=OFF" to the last code among the plurality of codes. The last code among the plurality of codes may include information indicating the absence of the next code.

According to this example, if the plurality of codes are read, the user can determine whether it is necessary to read the correlated next code with the large cell configuration by reading the first code with the small cell configuration. Therefore, the user can read the next code installed at a remote position, in response to the necessity. Accordingly, the convenience of the code reading by the user can be increased.

As shown in ACTS 204 and 207, the processor 11 can change whether to set the class information correlating to the next codes to the plurality of codes, respectively, in response to the presence or absence of the next code. The processor 11 can set the class information correlating to the next code such as "NCLASS=CLASS (N+1)" to the codes other than the last code among the plurality of codes. The codes other than the last code among the plurality of codes may include class information correlating to the next code. Meanwhile, the processor 11 can cause the class information correlating to the next code not to be set such as "NCLASS=NULL" to the last code among the plurality of codes. The last code among the plurality of codes may not include the class information correlating to the next code.

According to this example, if the plurality of codes are read, the user can recognize the class of the information recorded in the correlated next code with the large cell configuration by reading the first code with the small cell configuration. Therefore, the user can determine whether it is necessary to read the next code based on the class of the next code. The user can read the next code in response to the necessity. Accordingly, the convenience of the code reading by the user can be increased.

As shown in ACTS 204 and 207, the processor 11 can change whether to set the main information to the plurality of codes in response to the presence or absence of the next code. The processor 11 can cause the main information not to be set, such as "BODY=NULL", to the codes other than the last code among the plurality of codes. The codes other than the last code among the plurality of codes may not include the main information. Meanwhile, the processor 11 can set the main information such as "BODY="main information"" to the last code among the plurality of codes. The last code among the plurality of codes may include the main information.

According to this example, if the plurality of codes are read, the user can first read the codes with the low rankings and obtain the information relating to the correlated last code from the read codes with the low rankings. Therefore, only if it is determined that the reading is necessary, the last code including the main information can be read. The terminal of the user can decode the code in response to whether the reading is necessary. Accordingly, the user can prevent unnecessary reading of the last code with a higher density and a heavy decode processing load and thus the processing on the terminal side of the user can be reduced. The user can read the main information in response to the necessity. Accordingly, the convenience of the code reading by the user can be increased.

The processor 11 can record, as the main information, data such as text data, voice data, moving image data, and URL in the code.

According to this example, the user can acquire the main information not only visually but also auditorily. Therefore, the processor 11 can change a method of providing the main information in response to the code reading circumstance, and thus the convenience of the code reading by the user can be increased.

The processor 11 can generate the plurality of codes based on different parameters respectively correlating to the code rankings. For example, the processor 11 can generate the plurality of codes based on the cell configuration in response to the code ranking.

In this example, the processor 11 can generate the plurality of correlated codes with cell configurations different from each other. The user can determine whether it is necessary to read the correlated next code with the large cell configuration by reading the first code with the small cell configuration if the plurality of codes are read. Therefore, the user can read the next code installed at a remote position in response to the necessity. Accordingly, the convenience of the code reading by the user can be increased.

The first code, the second code, and the third code are described.

FIG. 4 is a diagram illustrating a configuration example of the two-dimensional code generated by the device 1 according to the first embodiment.

Each of the first code, the second code, and the third code includes the header information and the body information. The header information includes "code ranking", "class", "presence or absence of next code", and "next code class". The body information includes "main information". Each of the first code, the second code, and the third code is configured, for example, with the code array illustrated in FIG. 4. The first code, the second code, and the third code correlate to each other. In this example, the first code, the second code, and the third code are code set of codes relating to the landmark in which the information relating to the stone monument A is recorded.

The first code is a code in which "1" is set to the code ranking, "warning" is set to the class, "presence" is set to the presence or absence of next code, "landmark" is set to the next code class, and "absence" is set to the main information. The cell configuration of the first code is smaller than the cell configuration of the second code. Information recorded in the first code is simpler than that in the second code. That is, the information amount recorded in the first code is smaller than that in the second code.

The second code is a code in which "2" is set to the code ranking, "landmark" is set to the class, "presence" is set to the presence or absence of next code, "history" is set to the next code class, and "absence" is set to the main information. The cell configuration of the second code is smaller than the cell configuration of the third code. The cell configuration of the second code is larger than the cell configuration code of the first code. Information is recorded in the second code is more specific than that in the first code. That is, the information amount recorded in the second code is larger than that in the first code. Information recorded in the second code is simpler than that in the third code. That is, the information amount recorded in the second code is smaller than that in the third code.

The third code is a code in which "3" is set to the code ranking, "history" is set to the class, "absence" is set to the presence or absence of next code, "absence" is set to the next code class, and "stone monument A was built in 1876 . . . ." is set to the main information. The cell configuration of the third code is larger than the second code. Information recorded in the third code is more specific than that in the second code. That is, the information amount recorded in the third code is larger than that in the second code.

Second Embodiment

Hereinafter, a second embodiment is described with reference to the drawings.

For example, the second embodiment relates to the reading of the code such as the two-dimensional code generated in the first embodiment.

Figure 5:
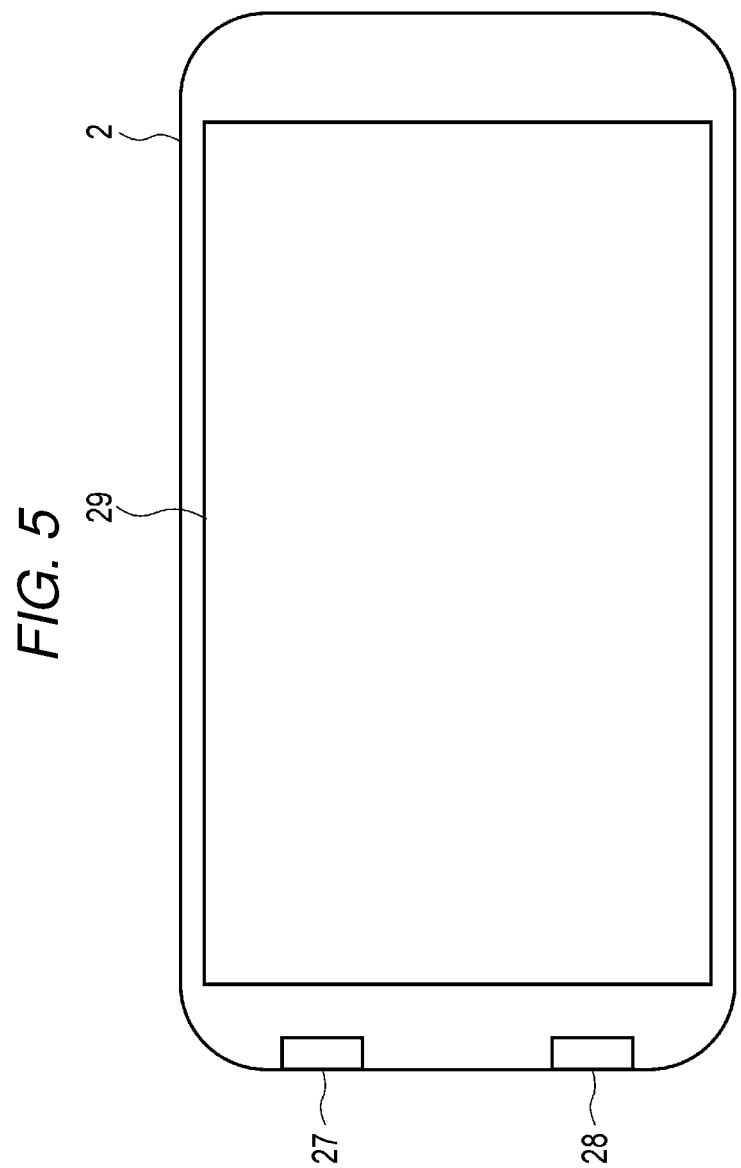
FIG. 5 is an example of an external view of a terminal according to a second embodiment, which is seen from a display side.

FIG. 5 is an example of an external view of a terminal 2 according to the second embodiment, which is seen from the display side.

The terminal 2 is a portable electronic device having a communication function. For example, the terminal 2 is a smart phone or a tablet terminal. The terminal 2 is a terminal possessed by the user. The terminal 2 is an example of the information processing terminal.

The terminal 2 includes a microphone 27, a speaker 28, and a display 29.

The microphone 27 is a device that can input a voice in the surrounding environment of the terminal 2. The voice input to the microphone 27 is a sound emitted in the environment where the terminal 2 is placed and a voice of a person in the surrounding environment where the terminal 2 is placed. The sound emitted in the surrounding environment where the terminal 2 is placed includes various sounds such as contact sounds of objects, operating sounds of devices, and music. The voice of a person in the surrounding environment where the terminal 2 is placed includes not only the voice of the user who uses the terminal 2 but also the voice of a person in the surrounding of the terminal 2. For example, the microphone 27 is provided on one end side of the terminal 2 in the longitudinal direction, but the position of the microphone 27 in the terminal 2 is not limited.

The speaker 28 is a device that can output a sound by the control of the terminal 2. For example, the speaker 28 is provided on one end side of the terminal 2 in the longitudinal direction, but the position of the speaker 28 in the terminal 2 is not limited.

The display 29 is a device that can display various screens by the control of the terminal 2. For example, the display 29 is a liquid crystal display or an Electroluminescence (EL) display.

Figure 6:
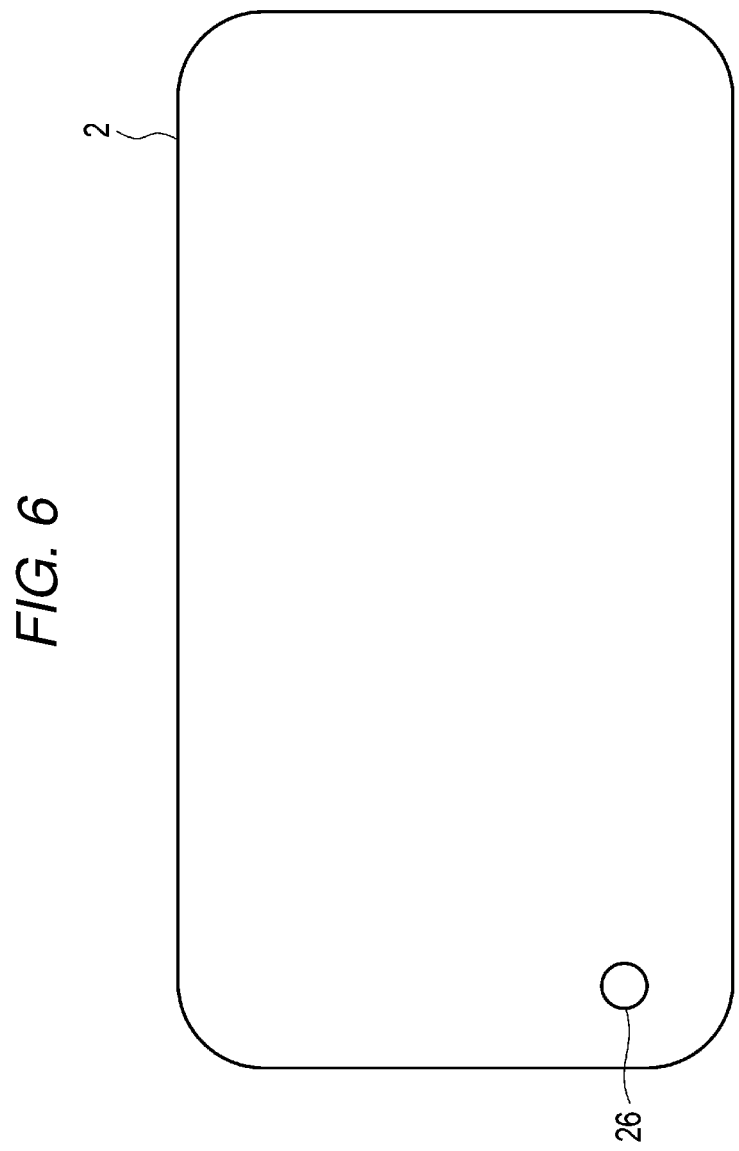
FIG. 6 is an example of an external view of the terminal, which is seen from the opposite side of the display.

FIG. 6 is an example of an external view of the terminal 2 according to the second embodiment, which is seen from the opposite side of the display.

The terminal 2 includes a camera 26 in addition to the microphone 27, the speaker 28, and the display 29 described above.

The camera 26 is a device that can identify an optically readable code symbol such as a two-dimensional code by image processing. The camera 26 is a camera including an image sensor such as a Charge Coupled Device (CCD) or a Complementary Metal-Oxide Semiconductor (CMOS). The camera 26 is an example of the image capturing unit.

Figure 7:
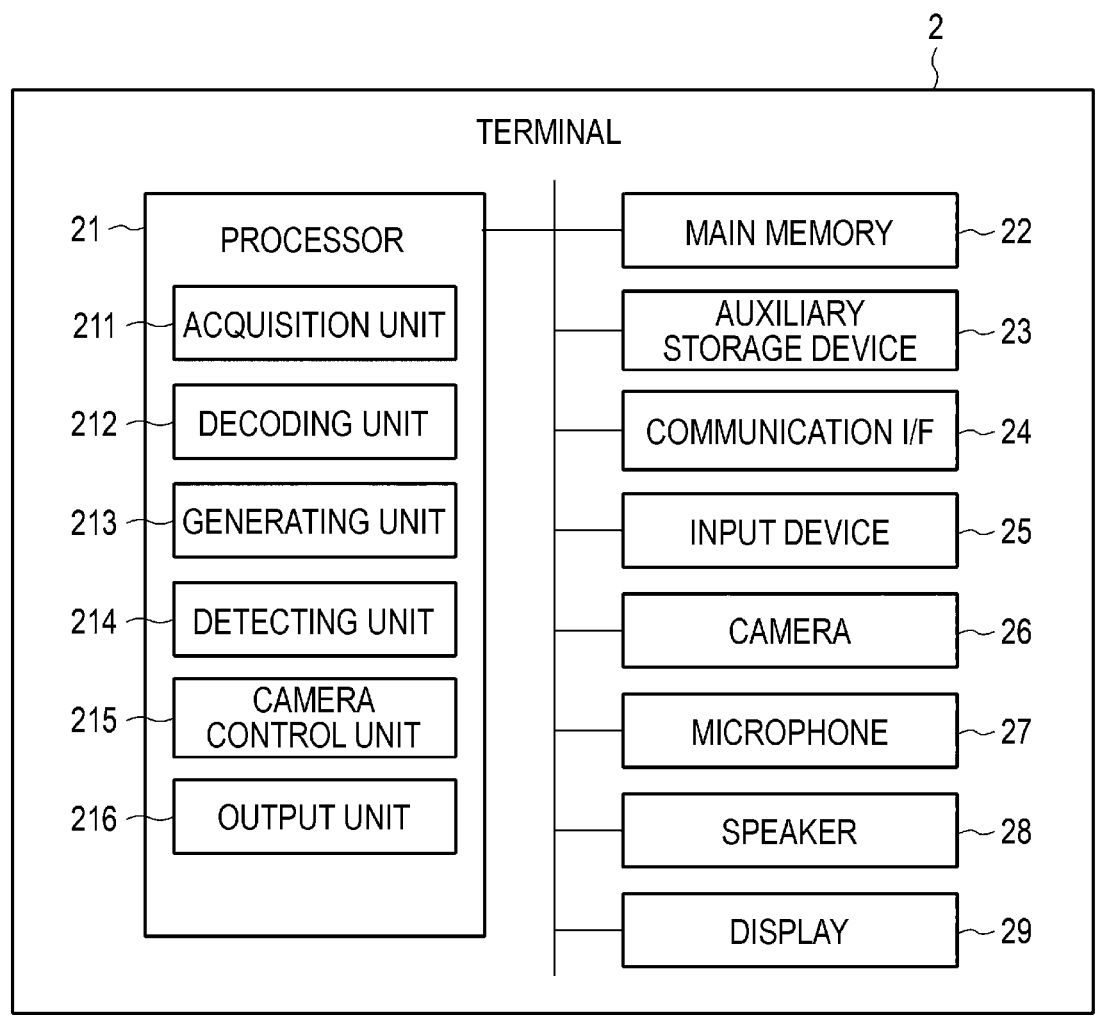
FIG. 7 is a block diagram illustrating the terminal.

FIG. 7 is a block diagram illustrating the terminal 2 according to the second embodiment.

The terminal 2 is a computer including a processor 21, a main memory 22, an auxiliary storage device 23, a communication interface 24, and an input device 25, in addition to the camera 26, the microphone 27, the speaker 28, and the display 29 described above. Each unit that configures the terminal 2 is connected to be capable of inputting and outputting a signal to and from each other. In FIG. 7, the interface is referred to as "I/F".

The processor 21 corresponds to a central portion of the terminal 2. The hardware configuration of the processor 21 has the same configuration as the processor 11 described above. The processor 21 loads a program stored in advance in the main memory 22 or the auxiliary storage device 23 onto the main memory 22. The program is a program that causes the processor 21 of the terminal 2 to realize each unit described below. The processor 21 performs various operations by executing the program loaded onto the main memory 22.

The main memory 22 corresponds to the main memory portion of the terminal 2. The hardware configuration of the main memory 22 has the same configuration as the main memory 12 described above. The main memory 22 stores a program.

The auxiliary storage device 23 corresponds to an auxiliary storage portion of the terminal 2. The hardware configuration of the auxiliary storage device 23 has the same configuration as the auxiliary storage device 13 described above. The auxiliary storage device 23 stores the program described above, data used for performing various processes by the processor 21, and data generated by a process in the processor 21.

The communication interface 24 includes various interfaces that communicably connect the terminal 2 to other devices via a network according to a predetermined communication protocol.

The input device 25 is a device that can input data or instructions to the terminal 2 by a touch operation. For example, the input device 25 is a keyboard, a touch panel, or the like.

The hardware configuration of the terminal 2 is not limited to the above configuration. The above components can be omitted or changed from the terminal 2, and new components can be added to the terminal 2.

Each unit installed in the processor 21 described above is described.

An acquisition unit 211, a decoding unit 212, a generating unit 213, a detecting unit 214, a camera control unit 215, and an output unit 216 are installed in the processor 21. Each unit installed in the processor 21 can be also referred to as each function. Each unit installed in the processor 21 can be installed in the control unit including the processor 21 and the main memory 22.

The acquisition unit 211 acquires various codes via the camera 26. For example, the acquisition unit 211 acquires the first code via the camera 26. The first code is a code with the minimum cell configuration among the plurality of codes correlated to each other. The acquisition unit 211 acquires the second code via the camera 26. The second code is a code with a cell configuration larger than that of the first code. The second code is a next code of the first code. The second code is a code in which more specific information is recorded than that in the first code. That is, the information amount recorded in the second code is larger than that in the first code. The first code and the second code correlate to each other. It is assumed that the first code and the second code are disposed close to each other, but the disposition condition is not limited thereto. In the first code, information relating to the second code correlating to the first code is recorded as the next code information. The information relating to the second code includes information indicating the presence or absence of the second code, as the information indicating the presence or absence of the next code. The information relating to the second code includes class information correlating to the second code as the class information correlating to the next code.

The decoding unit 212 decodes various codes acquired by the acquisition unit 211. For example, the decoding unit 212 decodes the first code acquired by the acquisition unit 211. The decoding unit 212 decodes the second code acquired by the acquisition unit 211. The decoding unit 212 determines the presence or absence of the second code correlating to the first code based on the first code acquired by the acquisition unit 211.

The generating unit 213 generates the notification relating to the second code correlating to the first code in response to the first code information decoded by the decoding unit 212. The first code information is information acquired by decoding the first code by the decoding unit 212. The notification relating to the second code is generated based on the next code information recorded in the first code. The generating unit 213 generates the notification indicating the class of the second code, for example, based on the class information correlating to the next code. The notification relating to the second code is notification indicating the class of the second code such as "there is code relating to signal"

or "there is code relating to history". The generating unit 213 may generate the notification indicating the class of the second code based on the information indicating the presence or absence of the next code. The notification relating to the second code may include notification indicating the presence or absence of the second code such as "there is correlated code".

The detecting unit 214 detects acquisition instruction for acquiring the second code. The acquisition instruction is instruction for acquiring the second code via the input device 25 by the user of the terminal 2. The detecting unit 214 detects the touch input to the display 29 by the user as the acquisition instruction. The touch input is realized by a touch on the code displayed on the display 29 by the user. The detecting unit 214 may detect the voice input via the microphone 27 as the acquisition instruction.

The detecting unit 214 may detect the acquisition instruction for acquiring the code by selecting the code to be acquired from the plurality of codes displayed on the display 29.

The camera control unit 215 controls a zoom function of the camera 26 in response to the detection of the acquisition instruction by the detecting unit 214. In the description below, "in response to" may be read as "based on".

The output unit 216 outputs various kinds of information to the display 29. For example, the output unit 216 outputs the notification relating to the second code generated by the generating unit 213. The output unit 216 outputs the second code information decoded by the decoding unit 212. The second code information is information acquired by decoding the second code by the decoding unit 212. The output unit 216 outputs the different information in response to whether the second code is acquired by the acquisition unit 211. For example, if the second code is acquired by the acquisition unit 211, the output unit 216 outputs the second code information. If the second code is not acquired by the acquisition unit 211, the output unit 216 outputs an error message. The error message is a message indicating that the second code cannot be acquired by the acquisition unit 211. The error message may include a recommendation message to the user for acquiring the second code. The recommendation message includes a message for recommending to physically approach the second code.

The output unit 216 may output the various kinds of information as the voice output via the speaker 28. In the description below, "outputting" may be read as "transmitting".

The acquisition unit 211, the detecting unit 214, and the output unit 216 are described to be installed in the processor 21 by performing the program, but are not limited thereto. The acquisition unit 211 may be realized in cooperation with the processor 21 and a device such as the camera 26 by executing a program. The detecting unit 214 may be realized in cooperation with the processor 21 and a device such as the input device 25 by executing a program. The output unit 216 may be realized in cooperation with the processor 21 and devices such as the speaker 28 and the display 29 by executing a program.

The first code and the second code are described.

Figure 8:
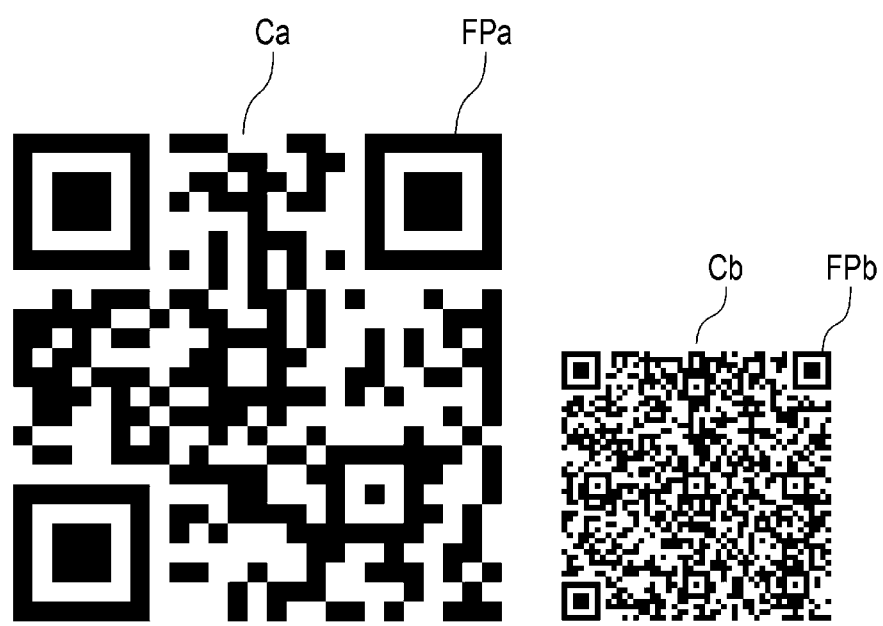
FIG. 8 is a diagram illustrating an example of a code read by the terminal.

FIG. 8 is a diagram illustrating an example of a code read by the terminal 2 according to the second embodiment.

FIG. 8 illustrates a first code Ca and a second code Cb. The first code Ca is generated with the minimum cell configuration (for example, the number of cells of 25×25) among two codes correlated to each other. The display size of the first code Ca is larger than the display size of the second code Cb. The display size is determined by the number of cells and the cell size. Therefore, the first code Ca can be recognized by capturing an image with the camera 26 from a remote location to a certain degree. The second code Cb is generated with a larger cell configuration (the number of cells of 49×49) than the first code Ca. The second code Cb is a code in which a larger information amount is recorded than in the first code Ca. The display size of the second code Cb is smaller than the display size of the first code Ca. Therefore, the second code Cb can be recognized by capturing an image with the camera 26 from a distance closer to the distance in which the first code Ca can be recognized.

In the first code Ca, next code information relating to the second code Cb correlating to the first code Ca is recorded. The next code information includes information indicating the presence or absence of the second code Cb, and the class information indicating the class of the information recorded in the second code Cb. The first code Ca and the second code Cb correlating to the first code Ca are closely disposed. The first code Ca and the second code Cb that are closely disposed are referred to as a code set in combination.

The cell configurations and the display sizes of the first code Ca and the second code Cb may be set in advance, and may be set in response to the circumstance of the location where the code set is installed, the circumstance in which the code set is captured, the information amount recorded in the first code Ca and the second code Cb, and the like.

It is assumed that the second code Cb has a large cell configuration to a degree of not being recognized under the condition where the first code Ca is captured. For example, a pitch of a finder pattern FPa of the second code Cb is set to be almost the same as or slightly smaller than the pitch of an alignment pattern of the first code Ca (not illustrated) or a finder pattern FPb.

Subsequently, the operation example of the terminal 2 configured as above is described with reference to the drawings.

Figure 9:
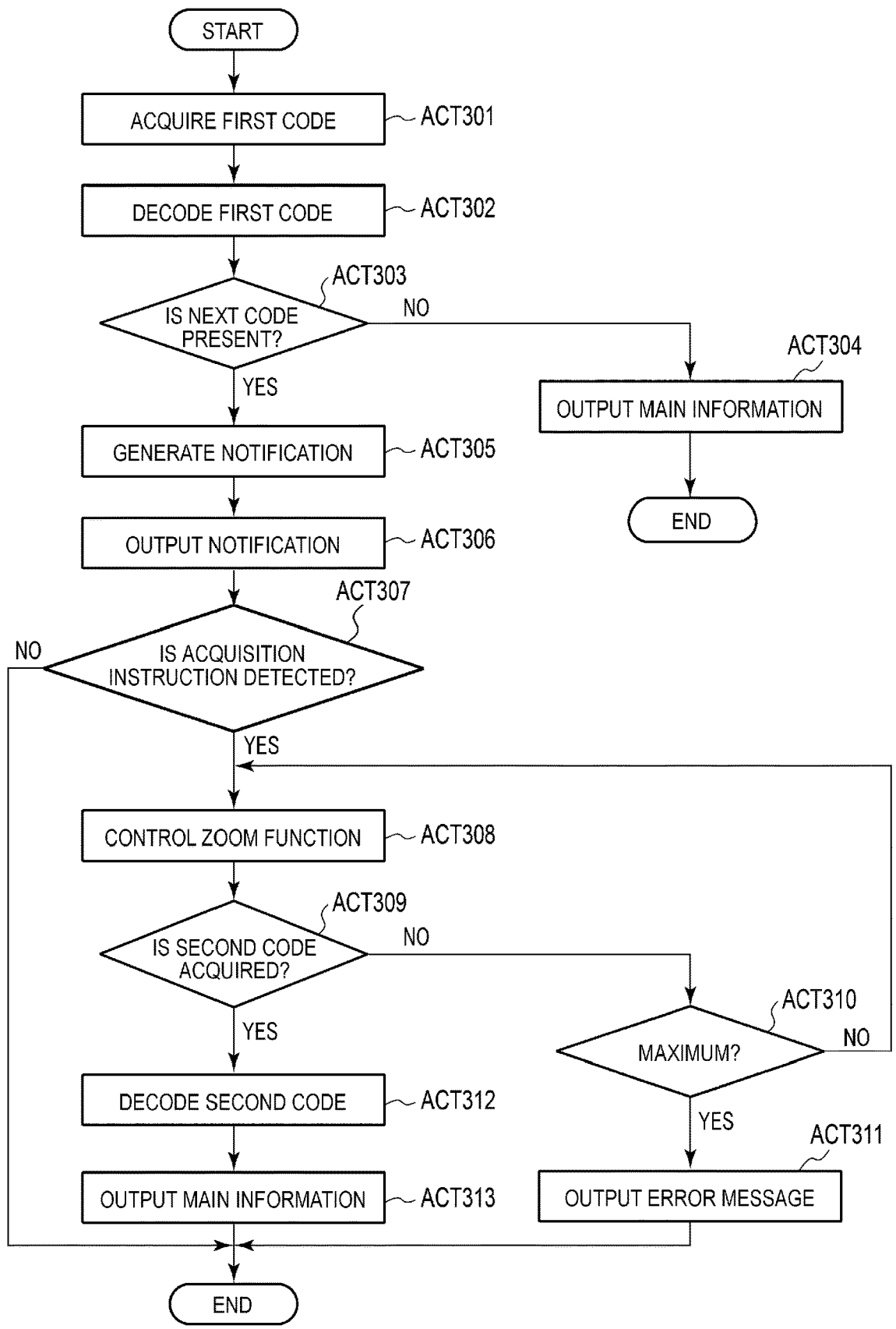
FIG. 9 is a flowchart illustrating a procedure of code reading processes by the terminal.

FIG. 9 is a flowchart illustrating a procedure of code reading processes by the terminal 2 according to the second embodiment.

Hereinafter, according to the flowchart illustrated in FIG. 9, the procedure of the code reading processes by the terminal 2 is described with reference to FIGS. 10 to 13.

Figure 10:
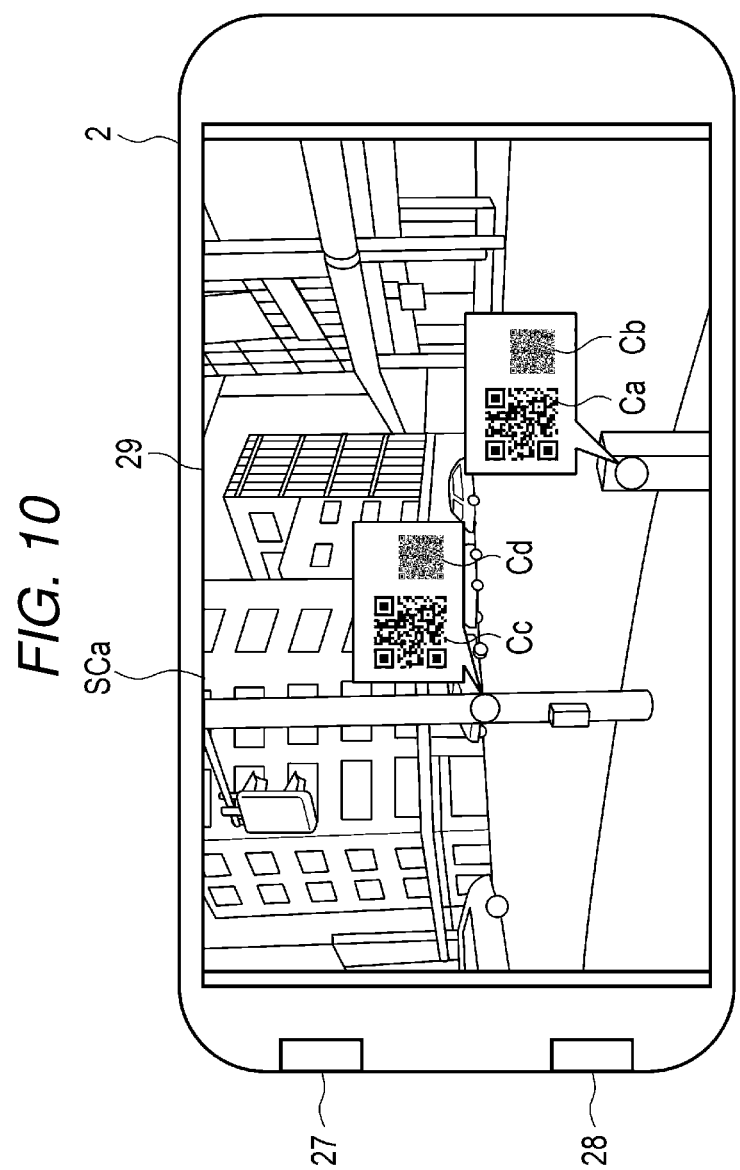
FIG. 10 is a diagram illustrating an example of a screen displayed on the display of the terminal.
Figure 11:
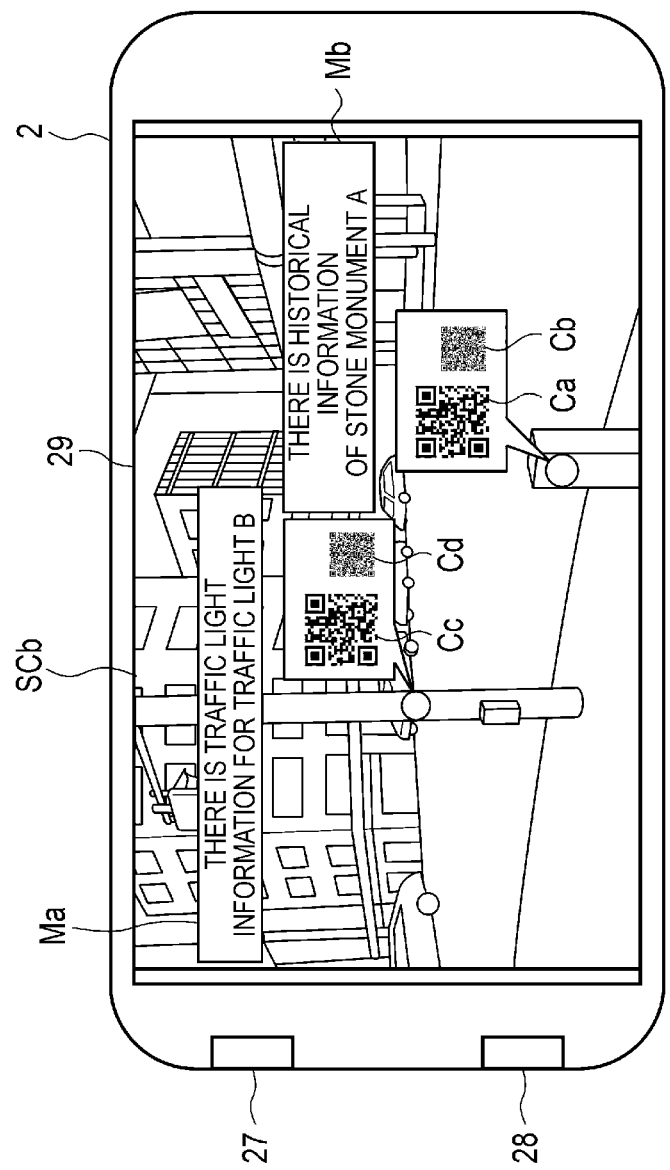
FIG. 11 is a diagram illustrating an example of a screen displayed on the display of the terminal.
Figure 12:
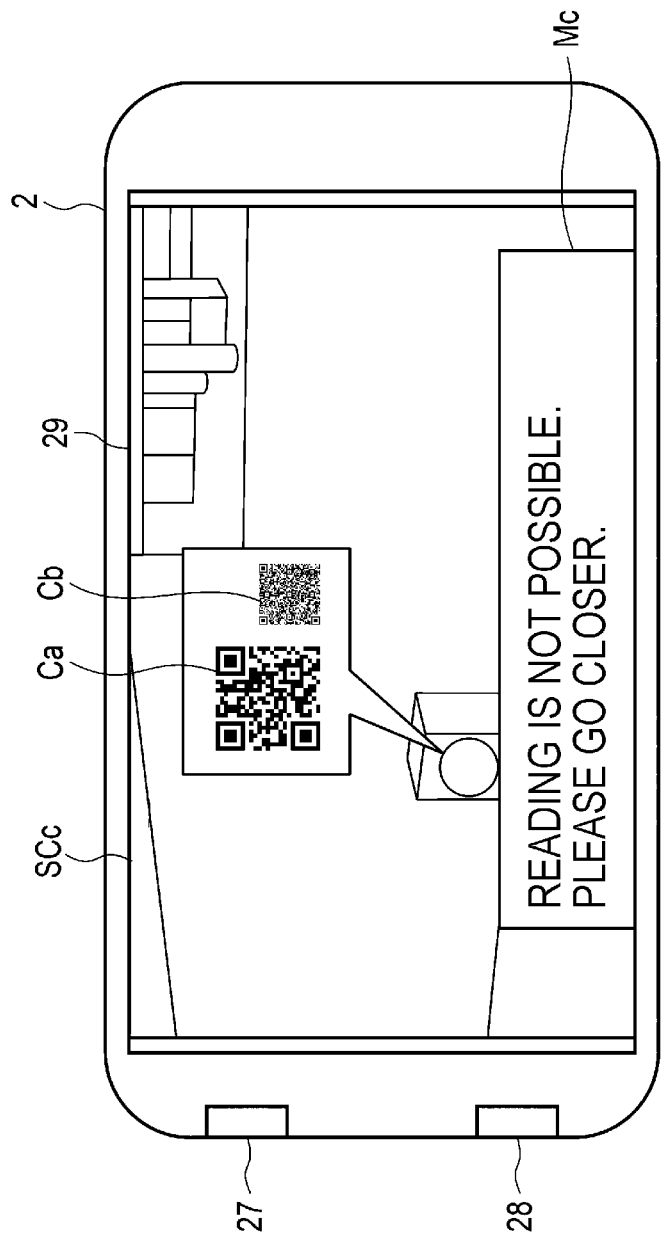
FIG. 12 is a diagram illustrating an example of the screen displayed on the display of the terminal.
Figure 13:
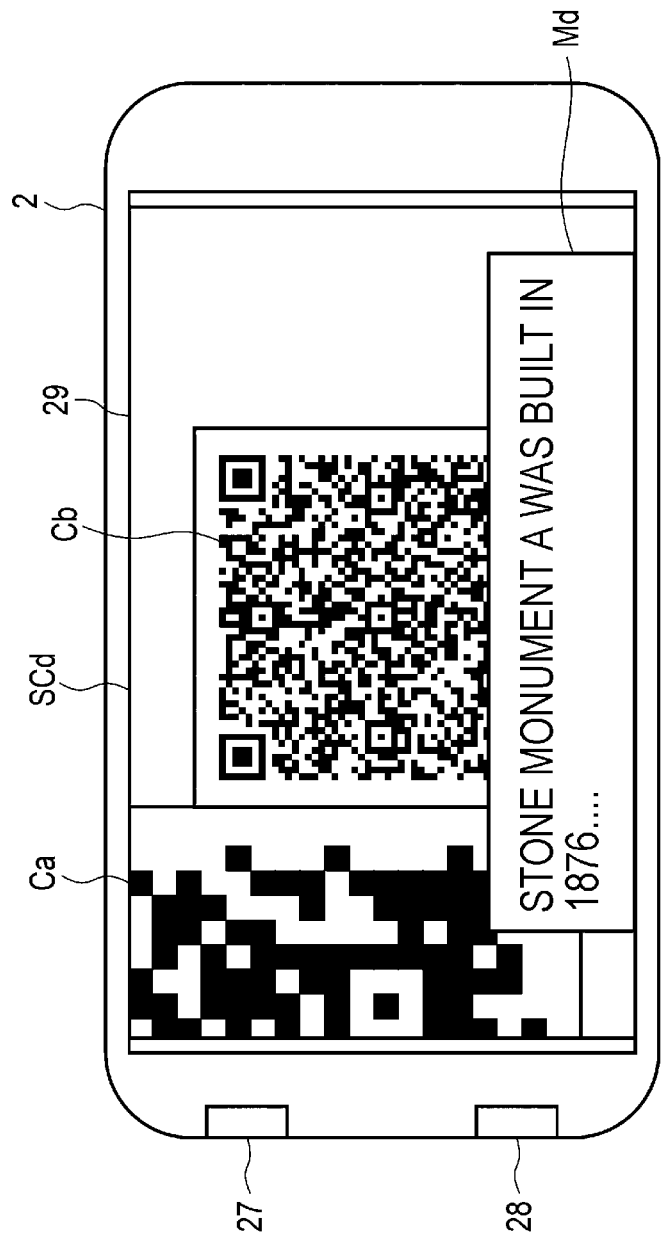
FIG. 13 is a diagram illustrating an example of the screen displayed on the display of the terminal.

FIG. 10 is a diagram illustrating an example of a screen displayed on the display 29 of the terminal 2 according to the second embodiment. FIG. 11 is a diagram illustrating an example of a screen displayed on the display 29 of the terminal 2 according to the second embodiment. FIG. 12 is a diagram illustrating an example of the screen displayed on the display 29 of the terminal 2 according to the second embodiment. FIG. 13 is a diagram illustrating an example of the screen displayed on the display 29 of the terminal 2 according to the second embodiment.

The processing procedure described below is merely an example, and each process may be changed, if possible. In the processing procedure described below, steps can be appropriately omitted, replaced, and added in response to the embodiments.

First, the user of the terminal 2 starts an application for code reading in the terminal 2 and holds the camera 26 toward the code. If the user holds the camera 26 toward the code, the terminal 2 starts the reading process of the procedure illustrated in the flowchart of FIG. 9. In this example, the description is made assuming a case where the code set of the first code and the second code are closely installed.

FIG. 10 is a diagram illustrating an example of the screen displayed on the display 29 if the camera 26 is held toward the code. FIG. 10 illustrates an image capturing screen SCa displayed on the display 29. In this example, it is assumed that the user reads the codes on the street. As illustrated in FIG. 10, the image capturing screen SCa includes a code set of the first code Ca and the second code Cb and a code set of a first code Cc aa a second code Cd. In this example, the description is made assuming a case where the camera 26 at the position of the user can only read the first code Ca and the first code Cc and cannot read the second code Cb and the second code Cd.

In the description below, the procedure of the reading processes with respect to the code set of the first code Ca and the second code Cb is described. The second code Cb corresponds to the next code of the first code Ca.

The acquisition unit 211 acquires the first code Ca via the camera 26 (ACT 301). The acquisition unit 211 may acquire a plurality of first codes via the camera 26. As described above, the generating unit 213 may generate the notification relating to a plurality of second codes correlating to a plurality of first codes in response to the acquisition of the plurality of first codes by the acquisition unit 211.

The decoding unit 212 decodes the first code Ca acquired by the acquisition unit 211 (ACT 302). In ACT 302, for example, the decoding unit 212 decodes the data recorded in the first code Ca and acquires the first code information.

The decoding unit 212 determines the presence or absence of the second code Cb correlating to the first code Ca based on the first code information (ACT 303). In ACT 303, for example, the decoding unit 212 acquires the next code information included in the first code information. The decoding unit 212 determines the presence or absence of the second code Cb from the next code information. If the decoding unit 212 determines that the second code Cb is present (ACT 303: YES), the process transitions from ACT 303 to ACT 305. If the decoding unit 212 determines that the second code Cb is not present (ACT 303: NO), the process transitions from ACT 303 to ACT 304. If the first code Ca does not include next code information, or the next code information in the first code Ca cannot be correctly recognized, the decoding unit 212 determines that the second code Cb is not present.

The output unit 216 outputs the main information included in the first code information to the display 29 in response to the determination by the decoding unit 212 that the second code Cb is not present (ACT 304). The output unit 216 may output the information indicating that the second code Cb is not present to the display 29. Thereafter, the process ends.

The generating unit 213 generates the notification relating to the second code Cb in response to the determination by the decoding unit 212 that the second code Cb is present (ACT 305). In ACT 305, for example, the generating unit 213 generates the notification relating to the second code Cb correlating to the first code Ca in response to the first code information decoded by the decoding unit 212. The generating unit 213 acquires the next code information included in the first code information. The generating unit 213 generates the notification indicating the class of the second code Cb based on the acquired next code information. For example, if the information of the history relating to the stone monument A is recorded in the second code Cb, the generating unit 213 generates the notification indicating the class of the information recorded in the second code Cb (also referred to as "the notification of the class") such as "there is history information of stone monument A". The generating unit 213 may generate the notification indicating that there is a next code (also referred to as "the notification of the presence of the next code") instead of or in addition to the notification of the class. The notification of the presence of the next code is, for example, notification such as "there is correlated code". The generating unit 213 may generate the notification relating to the plurality of next codes correlating to the plurality of first codes in the same manner as the generation of the notification relating to the second code correlating to one first code.

The output unit 216 outputs the notification relating to the second code Cb generated by the generating unit 213 (ACT 306). In ACT 306, for example, the output unit 216 outputs the notification of the class of the second code Cb to the display 29. The output unit 216 may output the notification of the presence of the next code to the display 29 instead of or in addition to the notification of the class. The output unit 216 may output the notification relating to the next code by a voice by using the voice data. Otherwise, the output unit 216 may output the notification relating to the next code as the moving image by using the moving image data. The output unit 216 may output the notification of the classes of the plurality of next codes to the display 29.

Hereinafter, the notification relating to the second code output by the output unit 216 is described with reference to FIG. 11. FIG. 11 is a diagram illustrating an example of the notification relating to the second code displayed on the display 29. FIG. 11 illustrates a notification screen SCb displayed on the display 29. In this example, a case where the code set of the first code Ca and the second code Cb and the code set of the first code Cc and the second code Cd are included in the imaged area of the camera 26 is assumed. As illustrated in FIG. 11, the display 29 displays that notification Mb "there is history information of stone monument A" of the class of the second code Cb generated based on the first code Ca by the generating unit 213. The display 29 displays notification Ma "there is traffic light information of traffic light B" of the class of the second code Cd generated based on the first code Cc by the generating unit 213. The user of the terminal 2 selects the code set area including the next code desired to be acquired by touch input according to the notification screen SCb. The code set area is an area on which the code set including the first code and the second code is displayed. The code set area may be an area including the area on which the code set is displayed and can be freely set. The touch input of the code set area is an example of the acquisition instruction of acquiring the next code. The user of the terminal 2 may input the voice input via the microphone 27 as the acquisition instruction.

According to this example, the output unit 216 can output the notification relating to the second code. Accordingly, the terminal 2 can encourage the user to be aware of the presence of another code correlated to the first code. The user can select whether to acquire the second code in response to the notification relating to the second code. Accordingly, the terminal 2 can selectively acquire the second code. Therefore, the terminal 2 can reduce an unnecessary code acquisition process. The output unit 216 can output the voice data and moving image data in addition to the text data. Accordingly, the user can select the acquisition of the code not only visually but also auditorily. Accordingly, the convenience of the code reading by the user can be increased.

Further, the output unit 216 can output the notification relating to the plurality of second codes to the display 29. Accordingly, the user can select the second code acquired from the plurality of second codes. Therefore, the terminal 2 can reduce the unnecessary code acquisition process.

The detecting unit 214 detects the acquisition instruction for acquiring the second code (ACT 307). In ACT 307, for example, the detecting unit 214 detects the touch input of the code set area by the user in the notification screen SCb. The detecting unit 214 detects that the code set area is touched by the signal from the display 29. A case where the detecting unit 214 detects that the code set area is touched is an example in which the detecting unit 214 detects the acquisition instruction by the user. The detecting unit 214 may detect the voice input via the microphone 27 by the user. In this case, a case where the voice input is detected by the detecting unit 214 is an example in which the detecting unit 214 detects the acquisition instruction by the user. If the notification relating to the plurality of second codes is displayed on the display 29, the detecting unit 214 may detect the acquisition instruction for acquiring the second code selected by the user. In this case, the user inputs the acquisition instruction by touching and selecting the code set area including the second code desired to be acquired. The detecting unit 214 may detect the selection of the second code by the voice input via the microphone 27 by the user.

If the detecting unit 214 detects the acquisition instruction (ACT 307: YES), the process transitions from ACT 307 to ACT 308. If the detecting unit 214 does not detect the acquisition instruction (ACT 307: NO), the process ends.

The camera control unit 215 controls the zoom function of the camera 26 in response to the detection of the acquisition instruction by the detecting unit 214 (ACT 308). In ACT 308, for example, in order to recognize the second code, the camera control unit 215 controls the zoom function of the camera 26 and performs close-up imaging.

The acquisition unit 211 acquires the second code via the camera 26 based on the control by the camera control unit 215 (ACT 309). Accordingly, the terminal 2 can acquire the second code without requiring a second code acquisition work by the user. The user does not have to find the second code via the camera 26. Accordingly, the convenience of the code reading by the user can be increased.

If the second code is acquired by the acquisition unit 211 (ACT 309: YES), the process transitions from ACT 309 to ACT 312. If the second code is not acquired by the acquisition unit 211 (ACT 309: NO), the process transitions from ACT 309 to ACT 310. As described above, the output unit 216 outputs the different information in response to whether the acquisition unit 211 acquires the second code.

The camera control unit 215 determines whether the zoom function of the camera 26 is controlled to the maximum (ACT 310). If it is determined that the camera control unit 215 controls the zoom function to the maximum (ACT 310: YES), the process transitions from ACT 310 to ACT 311. If it is determined that the zoom function is not controlled to the maximum by the camera control unit 215 (ACT 310: NO), the process transitions from ACT 310 to ACT 308. The camera control unit 215 repeatedly controls the zoom function until the second code is acquired by the acquisition unit 211 (ACTS 308 to 310).

According to this example, the camera control unit 215 can control the zoom function of the camera 26 until the second code is acquired in response to the detection of the acquisition instruction of the second code. Accordingly, the terminal 2 can acquire the second code without requiring the second code acquisition work by the user. The user does not have to find the second code via the camera 26. Accordingly, the convenience of the code reading by the user can be increased.

The output unit 216 outputs the error message to the display 29 in response to the determination that the zoom function is controlled to the maximum by the camera control unit 215. The output unit 216 may output the error message by a voice via the speaker 28 by using the voice data. Otherwise, the output unit 216 may output the error message as the moving image to the display 29 by using the moving image data.

Hereinafter, the error message output by the output unit 216 is described with reference to FIG. 12. FIG. 12 is a diagram illustrating an example of the notification relating to the next code displayed on the display 29. FIG. 12 illustrates a notification screen SCc displayed on the display 29. In this example, a case where the code set of the first code Ca and the second code Cb is included in the imaged area of the camera 26, and there is an acquisition instruction of the second code Cb by the user is assumed. As illustrated in FIG. 12, the output unit 216 outputs an error message "Reading is not possible. Please go closer." to the display 29. It is assumed that the user who receives the error message approaches the second code Cb and holds the camera 26 over the second code Cb.

In this example, if the second code is not acquired by the control of the zoom function, the output unit 216 can output the error message to the user. Accordingly, the terminal 2 can encourage the operation to the second code acquisition by the user. Therefore, the terminal 2 can reduce the number of trial processes for the second code acquisition by the user.

If the next code is acquired by the acquisition unit 211, the decoding unit 212 decodes the second code acquired by the acquisition unit 211 (ACT 312). In ACT 312, for example, the decoding unit 212 decodes the data recorded in the second code and acquires the second code information. The second code information includes the main information of the second code.

The output unit 216 outputs the second code information decoded by the decoding unit 212 (ACT 313). In ACT 313, for example, the output unit 216 outputs the main information included in the second code information recorded in the second code to the display 29. The output unit 216 may output the main information by a voice via the speaker 28 by using the voice data. Otherwise, the output unit 216 may output the main information to the display 29 as the moving image by using the moving image data.

Hereinafter, the main information output by the output unit 216 is described with reference to FIG. 13. FIG. 13 is a diagram illustrating an example of the main information displayed on the display 29. FIG. 13 illustrates a notification screen SCd displayed on the display 29. In this example, a case where the acquisition instruction of the second code Cb is given by the user, and the second code Cb is acquired by the acquisition unit 211 is assumed. As illustrated in FIG. 13, the output unit 216 outputs the main information of the second code Cb such as "stone monument A was built in 1876 . . . " to the display 29.

According to this example, the output unit 216 can output the second code information such as the main information of the second code selected by the user. Therefore, the terminal 2 can reduce an unnecessary code acquisition process. The output unit 216 can output the main information of the second code as the voice data and moving image data in addition to the text data. Accordingly, the user can acquire the information of the code not only visually but also auditorily. Accordingly, the convenience of the code reading by the user can be increased.

The present embodiment is described in an assumption of the code installed on the street, but is not limited thereto. The present embodiment may be applied to, for example, a case where a code is used for managing merchandises in a distribution center, a factory, or the like. In this case, the terminal 2 may be read as a reading device dedicated to code reading.

The program may be transferred in a state of being stored in the electronic device or may be transferred in a state of not being stored in the electronic device. In the latter case, the program may be transferred via the network or may be transferred in a state of being recorded on a recording medium. The recording medium is a non-temporary tangible medium. The recording medium is an electronic device readable medium. As long as the recording medium is a medium that can store a program such as a CD-ROM or a memory card and can be read by an electronic device, the form thereof is not limited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code generation method, comprising:
acquiring class information correlated with each of a plurality of code rankings based on a plurality of different cell configurations; and
generating a plurality of codes including the acquired class information based on the cell configurations according to the code rankings, wherein
each of the plurality of codes includes information indicating a presence or an absence of a code of a next related ranking.

2. The code generation method according to claim 1, wherein
whether or not to set the class information correlated with the code of the next ranking in each of the plurality of codes is changed depends on the presence or the absence of the code of the next ranking.

3. The code generation method according to claim 1, wherein
whether or not to set main information in each of the plurality of codes is changed depends on the presence or the absence of the code of the next ranking.

4. The code generation method according to claim 1, wherein
the plurality of codes are generated based on different parameters respectively correlated with the code rankings.

5. The code generation method according to claim 1, wherein
the code rankings correspond to an ascending order of a size of the cell configurations.

6. The code generation method according to claim 1, wherein
the plurality of codes comprise two-dimensional codes.

7. A code generation device, comprising:
a processor configured to:
acquire class information correlated with each of a plurality of code rankings based on a plurality of different cell configurations; and
generate a plurality of codes including the acquired class information based on the cell configurations according to the code rankings, wherein
each of the plurality of codes includes information indicating a presence or an absence of a code of a next related ranking.

8. The code generation device according to claim 7, wherein
whether or not to set the class information correlated with the code of the next ranking in each of the plurality of codes is changed depends on the presence or the absence of the code of the next ranking.

9. The code generation device according to claim 7, wherein
whether or not to set main information in each of the plurality of codes is changed depends on the presence or the absence of the code of the next ranking.

10. The code generation device according to claim 7, wherein
the plurality of codes are generated based on different parameters respectively correlated with the code rankings.

11. The code generation device according to claim 7, wherein
the code rankings correspond to an ascending order of a size of the cell configurations.

12. The code generation device according to claim 7, wherein
the plurality of codes comprise two-dimensional codes.

13. The code generation device according to claim 7, wherein
the code generation device is a Personal Computer, a smart phone, or a tablet terminal.

14. A quick-read code generation device, comprising:
a processor configured to perform operations comprising:
acquiring class information correlated with each of a plurality of code rankings based on a plurality of different cell configurations; and
generating a plurality of codes including the acquired class information based on the cell configurations according to the code rankings, wherein
each of the plurality of codes includes information indicating a presence or an absence of a code of a next related ranking.

15. The quick-read code generation device according to claim 14, wherein
whether or not to set the class information correlated with the code of the next ranking in each of the plurality of codes is changed depends on the presence or the absence of the code of the next ranking.

16. The quick-read code generation device according to claim 14, wherein
whether or not to set main information in each of the plurality of codes is changed depends on the presence or the absence of the code of the next ranking.

17. The quick-read code generation device according to claim 14, wherein
the plurality of codes are generated based on different parameters respectively correlated with the code rankings.

18. The quick-read code generation device according to claim 14, wherein
the code rankings correspond to an ascending order of a size of the cell configurations.

19. The quick-read code generation device according to claim 14, wherein
the plurality of codes comprise two-dimensional codes.

20. The quick-read code generation device according to claim 14, wherein the code generation device is a Personal Computer, a smart phone, or a tablet terminal.

* * * * *